United States Patent
Cassidy et al.

(10) Patent No.: US 9,524,036 B1
(45) Date of Patent: Dec. 20, 2016

(54) MOTIONS FOR DISPLAYING ADDITIONAL CONTENT

(71) Applicant: Amazon Technologies, Inc., Reno, NV (US)

(72) Inventors: Ryan Hastings Cassidy, Seattle, WA (US); Robert King Myers, Santa Cruz, CA (US)

(73) Assignee: Amazon Technologies, Inc., Reno, NV (US)

( * ) Notice: Subject to any disclaimer, the term of this patent is extended or adjusted under 35 U.S.C. 154(b) by 694 days.

(21) Appl. No.: 13/794,573

(22) Filed: Mar. 11, 2013

(51) Int. Cl.
*G06F 3/0346* (2013.01)

(52) U.S. Cl.
CPC .................................. *G06F 3/0346* (2013.01)

(58) Field of Classification Search
CPC ............ G06F 3/0346; G06F 2200/1614; G06F 1/1618; G06F 17/273; G06F 3/04842; G06F 2200/1637; G06K 9/3208
See application file for complete search history.

(56) References Cited

U.S. PATENT DOCUMENTS

| | | | |
|---|---|---|---|
| 6,556,841 B2 * | 4/2003 | Yu | 455/556.1 |
| 8,401,815 B2 * | 3/2013 | Dohta | 702/150 |
| 8,583,672 B1 * | 11/2013 | Paskin et al. | 707/765 |
| 8,619,050 B2 * | 12/2013 | Herz et al. | 345/173 |
| 8,832,823 B2 * | 9/2014 | Boss et al. | 726/16 |
| 9,075,451 B2 * | 7/2015 | Gardenfors et al. | |
| 9,213,477 B2 * | 12/2015 | Singhal | G06F 3/0488 |

* cited by examiner

*Primary Examiner* — Abbas Abdulselam
(74) *Attorney, Agent, or Firm* — Polsinelli LLP

(57) ABSTRACT

Various types of content can be displayed through an interface of a computing device. Portions of this content, such as words or alphanumeric characters, can have a visual identifier displayed proximate those portions. The identifiers can indicate the availability of additional content, such as one or more alternative spellings or corrections, links to additional information, alternative views, and links to contact information for a name in an address book. In one example, a default viewing orientation of the computing device can be determined for a user viewing the content on the interface. Upon detecting a rotation of the computing device, a banner or other graphical element is displayed for each of the displayed portions that are associated with a visual identifier on the interface. Accordingly, a user can select one of those elements to receive the additional information.

18 Claims, 9 Drawing Sheets

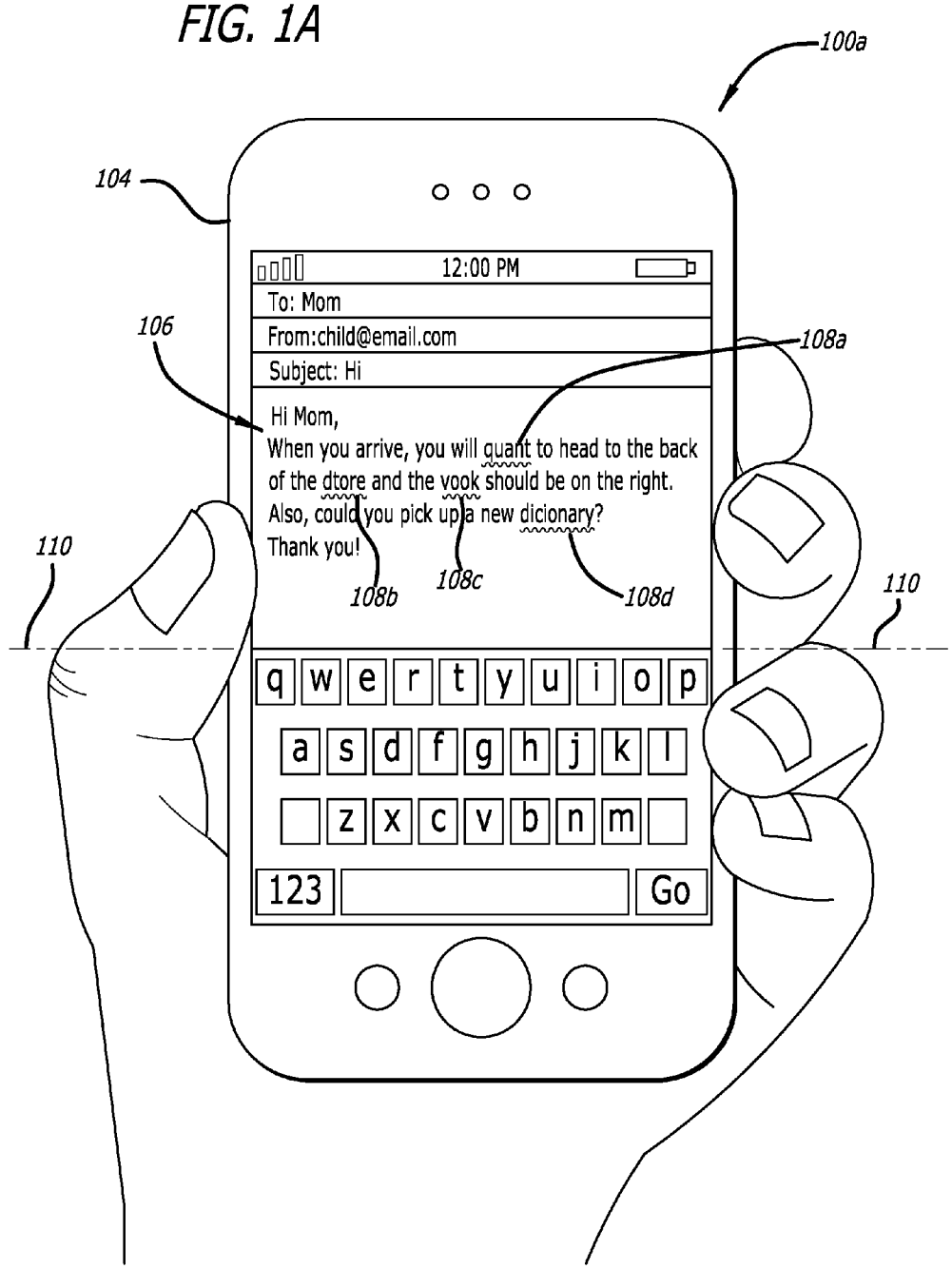

MOTIONS FOR DISPLAYING ADDITIONAL CONTENT

BACKGROUND

Users are increasingly relying upon various electronic and computing devices to store, track, and update various types of information and handle various types of tasks. For example, many users rely upon computing devices to store contact information, compose emails and notes, read news, articles, or books, and otherwise obtain other such information. Unfortunately, the data is often not organized or presented in a way that is intuitive for many users and, for portable computing devices such as smart phones or tablet computers, the screen size can be limited such that it can be difficult for a user to locate information due to the size of the various icons or elements with respect to the size of a user's finger. As technology advances and as people are increasingly using portable computing devices in a wider variety of ways, it can be advantageous not only to adapt the ways in which users are provided with information, but also the ways in which users access the same.

BRIEF DESCRIPTION OF THE DRAWINGS

Various embodiments in accordance with the present disclosure will be described with reference to the drawings, in which:

FIGS. 1A and 1B illustrate an example operation of an interface that can be provided in accordance with at least one embodiment;

DETAILED DESCRIPTION

Figure 1B:
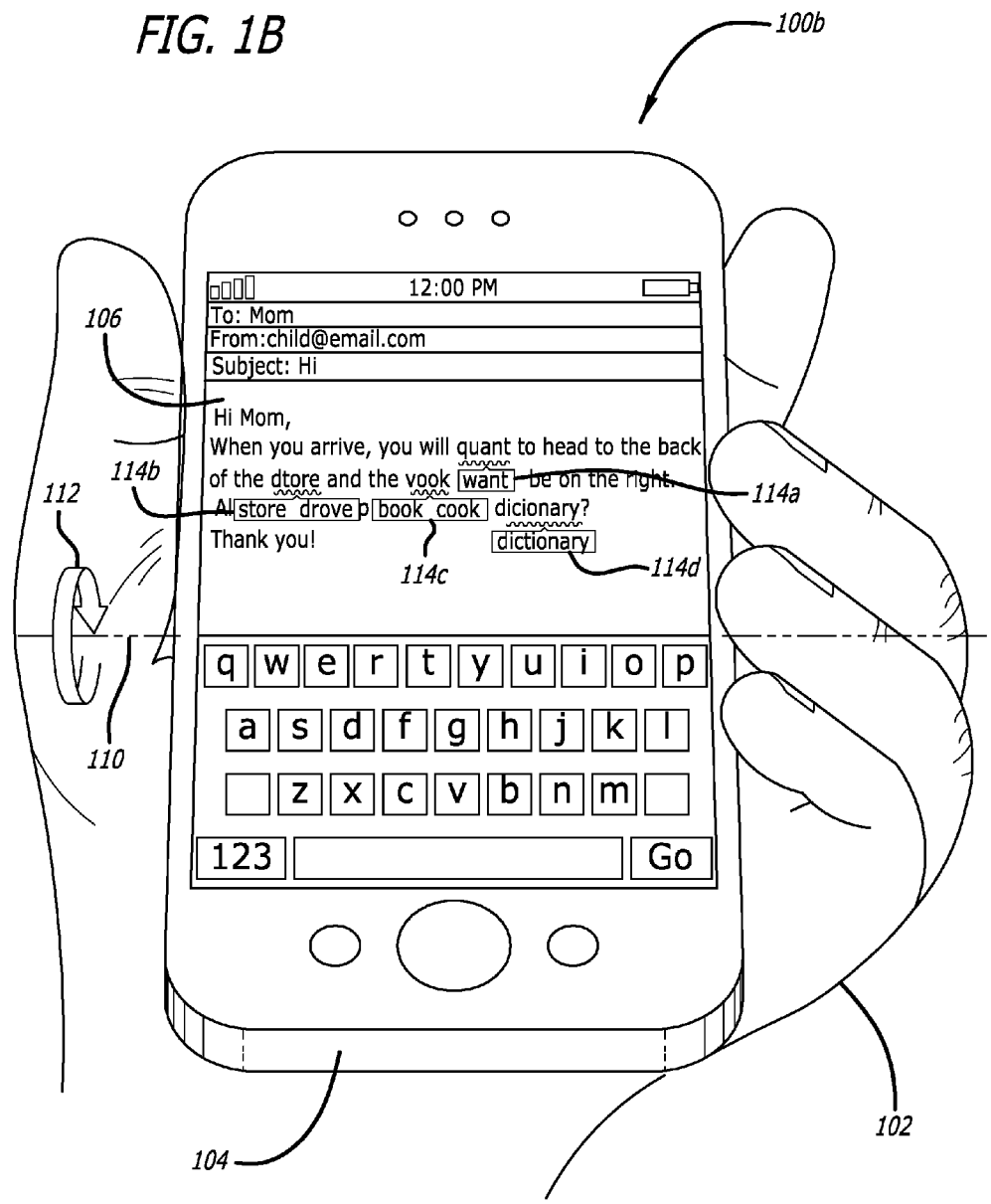

Systems and methods in accordance with various embodiments of the present disclosure may overcome one or more of the aforementioned and other deficiencies experienced in conventional approaches to enabling a user to interact with a computing device. In particular, various approaches enable users to obtain additional information for a word, or other piece of content, while reading, viewing, or typing within a document or other electronic file. In one example, the additional information can be a definition or link to additional information for a word in an electronic book or an article through a web browser. In another example, the additional information can include alternative words or spellings for a word that is potentially misspelled. In at least one embodiment, banners or other elements for displaying the additional information are revealed when the user tilts the computing device in a predetermined direction, by at least a determined amount, and hidden when tilted back to within the determined amount of the default or home position. In accordance with various embodiments, a banner may refer to a graphical element or a text box overlay displayed above, over, or alongside at least some other content on a display element of a computing device that can provide users with additional information regarding various aspects of the other content.

In at least one embodiment, text displayed on an interface of a computing device includes words, and at least some of those words include a visual identifier. The identifier can include a highlight, underline, or other graphical identifier indicating that one or more words that are misspelled or are associated with links to additional information. In such an example, a default viewing orientation of the computing device is determined for a user viewing the text on the interface. Upon detecting a rotation of the computing device by an amount greater than a threshold deviation from the default viewing orientation about a determined axis, a banner (or other graphical element) is displayed for each of the at least some words that are associated with the visual identifier on the interface. Accordingly, a user can select one of those banners to receive additional or supplemental information for the associated word or term.

Further, various approaches discussed herein enable a user to interact with the banners as part of a three-dimensional display or quasi-three-dimensional rendering of the banners over text of the document or electronic reader on a two-dimensional display element. In this example, the banners are rendered to appear to be hovering above the text of the document or electronic reader, although other types of displays can be utilized as well. One or more cameras of the computing device can be used to track the relative head position of a user in order to detect rotational changes for displaying the banners and to assist in generating a perspective-appropriate "three-dimensional" image on a display screen of the device. Accordingly, changes in the relative position of the user's head can result from motion of the user or the device, or a combination of both. One or more sensors such as an electronic gyroscope or accelerometer can be used to track motion of the device and when the user moves out of the field of view of a camera that is tracking the head position, the sensors can provide information about the movement of the device to enable estimation of the current position of the user's head with respect to the device, as may be due to a rotation, tilting, or translation of the device.

Various other functions and advantages are described and suggested below as may be provided in accordance with the various embodiments.

FIGS. 1A-1B illustrate an example graphical user interface (GUI) on a computing device 104 that can be used to provide users with additional information or content in accordance with at least one embodiment. FIG. 1A illustrates a situation 100a in which a user has made a few spelling mistakes while typing an email 106 on the computing device 104. The first word that the user misspelled is the word "want," which was spelled "qant." In this example, an identifier 108a is provided underneath the misspelled word "qant" as at least an indication that the user misspelled the word. Similarly, the user has misspelled word "store," which is spelled "dtore," the word "book," which is spelled "vook," and the word "dictionary," which is spelled "dicionary." Each of these words is provided with an identifier 108b, 108c, and 108d respectively to highlight the fact that they are misspelled.

Further, FIG. 1A shows one example of an axis 110 about which a user can rotate the computing device 104. In at least one embodiment, the computing device 104 can determine a default viewing orientation for a user in a particular instance. For example, a user could be lying down with the computing device 104 above their head, holding computing device 104 substantially upright while standing, or typing while computing device 104 lies flat on a surface, such as a table. In each of these instances, the default viewing orientation of the computing device 104 is different. Accordingly, FIG. 1B illustrates an example situation 100b where the computing device 104 has been rotated 112 beyond a determined threshold about the example axis 110. The example axis 110, as discussed herein, is for illustrative purposes only. In practice there may or may not be a defined axis about which the computing device 104 rotates about, but may be associated with a relative angular change. In this example, rotating 112 the computing device 104 beyond the determined threshold about the example axis 110 causes banners 114a, 114b, 114c, and 114d associated with the identifiers 108a, 108b, 108c, and 108d to be displayed for their respective misspelled word. In this example, the banner 114a includes an alternative spelling for the word "qant," which is "want," banner 114b includes an alternative spellings for the word "dtore," which are "store" and "drove," banner 114c includes an alternative spellings for the word "vook," which are "book" and "cook," and banner 114d includes an alternative spelling for the word "dicionary," which is "dictionary." Therefore, in at least one embodiment, alternative spellings or alternative word suggestions can be displayed to users as banners adjacent their respective misspelled word in response to a tilt, flick, or other user provided movement, command, or gesture.

In at least one embodiment, after the banner is revealed with the alternate spelling, a user can tap or provide a touch selection to the banner on a touch screen to have the word replace the misspelled word. In one example, the user may need to choose a word among a few possible spellings by selecting the desired alternate spelling. Alternatively, a misspelled or unrecognized word could be automatically replaced or autocorrected with an alternate/correct spelling, or a word with a highest probability given the current character sequence, when the device is tilted or flicked as described elsewhere herein. In at least one embodiment, various degrees of tilt could trigger different actions. For example, tilting the device beyond a first threshold angle (e.g. 20 degrees) could cause the banners to be revealed with alternate spellings then, as the device is tilted past a second threshold angle (e.g. 45 degrees), the words could be automatically replaced with the currently reveal or displayed alternate spellings or with words having a highest probability given a particular character sequence/arrangement. Various other types of motions or selections can be used as well to reveal various types of information to users within the scope of the various embodiments.

Figure 2A:
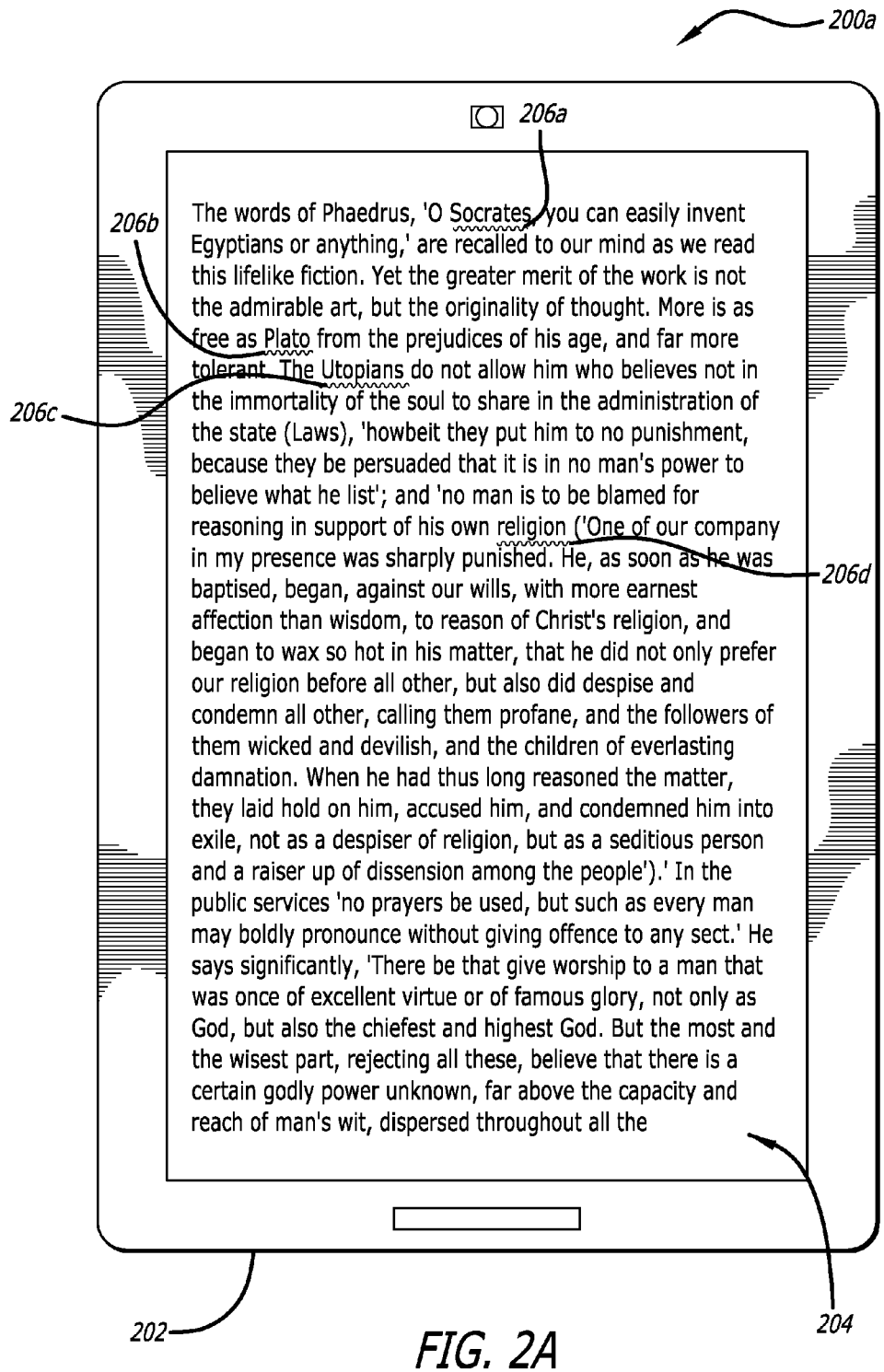
FIGS. 2A and 2B illustrate another example operation of an interface that can be provided in accordance with at least one embodiment.
Figure 2B:
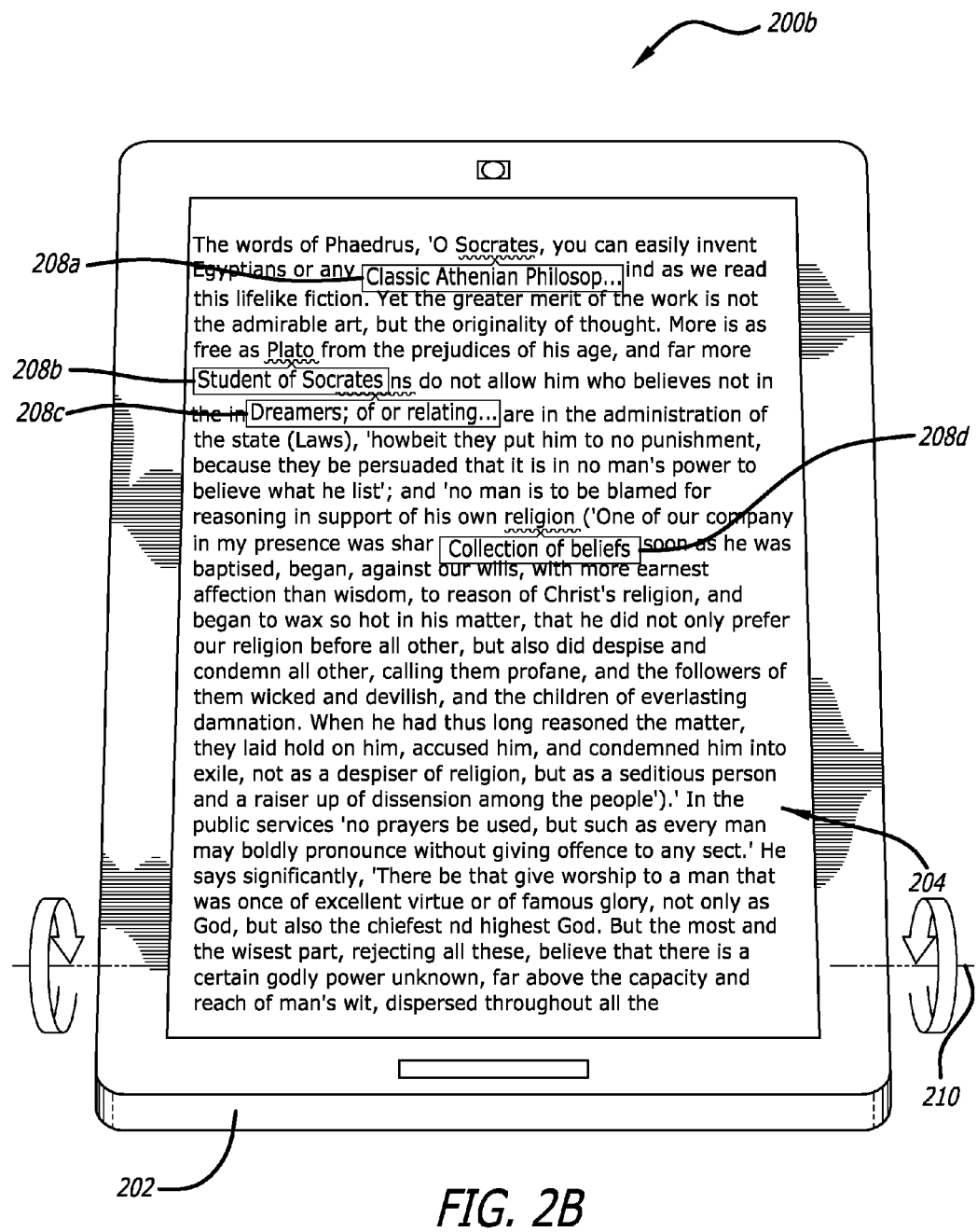

FIGS. 2A-2B illustrate another example graphical user interface (GUI) on a computing device 202 that can be used to provide users with additional information or content in accordance with at least one embodiment. FIG. 2A illustrates a situation 200a in which a user is reading an electronic book on the computing device 202. In this example, particular words within the page 204 of the electronic book are provided with identifiers 206a, 206b, 206c, and 206d that indicate that additional information for the respective word is available. For example, the identifier 206a is provided for the word "Socrates," the identifier 206b is provided for the word "Plato," the identifier 206c is provided for the word "Utopians," and the identifier 206d is provided for the word "religion." Accordingly, as described above with respect to FIG. 1, FIG. 2B illustrates an example situation 200b where the computing device 202 has been rotated beyond a determined threshold about an example axis 210. In this example, rotating the computing device 202 beyond a determined threshold, about the example axis 210, causes or triggers the banners 208a, 208b, 208c, and 208d associated with the identifiers 206a, 206b, 206c, and 206d to be displayed. In this example, additional or supplemental information is provided for each word having a banner. For example, the banner 208a associated with Socrates starts to describe Socrates from a source, such as a wiki entry or other online encyclopedia, glossary, or dictionary. The information contained in the banner 208a could also be cached or be part of the same file as the electronic book saved on the computing device 202 itself. Further, the user can select the banner 208a to be taken to a full entry describing Socrates, his life, his other or related works to purchase through an electronic retailer, or other history and information associated therewith. Accordingly, the user may also select the banners 208b, 208c, and 208d to be provided with additional information about "Plato," the "Utopians," and "religion" respectively.

Various other types of information and media can be utilized and provided as well within the scope of the various embodiments. For example, besides textual information, other content, information, or objects, such as images, video, and the like can be presented to users as banners. Further, the identifiers indicating the availability of additional content can also include identifiers for alternative views of items in an image, such as in a mapping application, and identifiers for names of people in the user's address book. In this example, the additional information could allow the user to choose between various alternative views and be linked to a contact's address, email, and phone number, respectively. In another example, a banner may include a URL or hyperlink to a webpage, wiki page, a page for a product available for purchase from an electronic retailer, and the like. Further, the banners could include information, such as an annotation, that has been provided by the user, or by other users viewing the same content from another device through a network. The user provided information can include annotations or notes regarding certain words, objects, or passages, and the like. Various other types of items and information can be provided as the additional information to users as well within the scope of the various embodiments.

Figure 3:
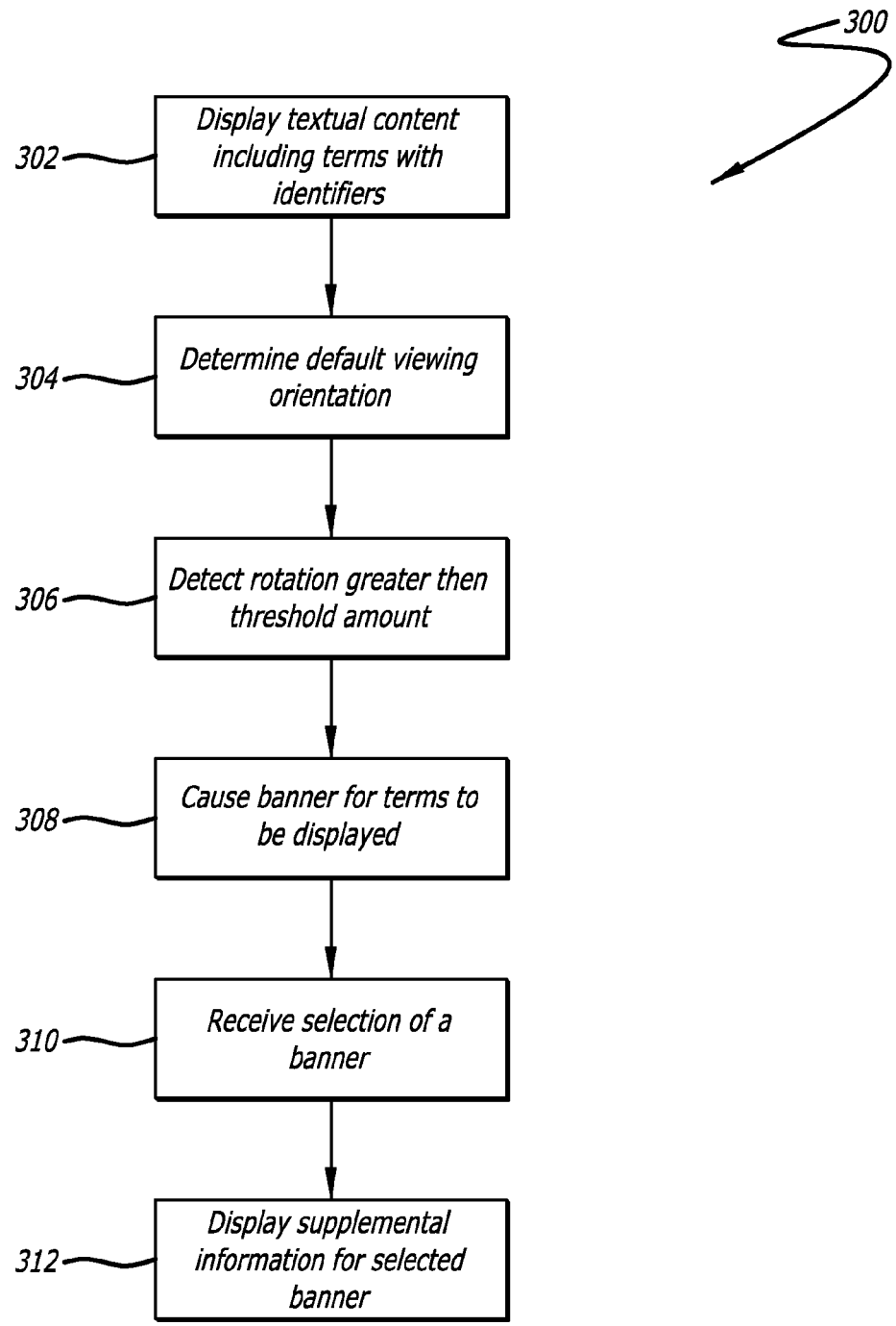
FIG. 3 illustrates an example process for changing between keyboards that can be used in accordance with at least one embodiment.

FIG. 3 illustrates an example process 300 for providing additional information to users that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, text displayed on an interface of a computing device includes words and at least some of the words include a visual identifier 302, such as if the word is misspelled or includes a link for additional information. In this example, a default viewing orientation of the computing device is determined for a user viewing the text on the interface 304. Upon detecting a rotation of the computing device greater than a threshold deviation from the default viewing orientation about a determined axis 306, a banner is displayed for each of the at least some words that include the visual identifier on the interface 308. The default viewing orientation and the rotation can be determined using at least one orientation determining element, such as at least one of a gyroscope, electronic compass, or an accelerometer. In this example, a selection for additional information for a banner is received 310 from the user and the supplemental information for the selected banner is displayed 312 to the user. Further, in at least one embodiment, the banners or other elements for displaying the additional information are revealed when the user tilts the computing device in the predetermined direction, by at least the determined amount, and is additionally hidden when tilted back to within the determined amount of the default or home position. Various other types of information can be utilized and provided as well within the scope of the various embodiments.

In at least one embodiment, there are multiple thresholds for triggering the display of the banners. The first threshold could be associated with animating a display for partially revealing the banners to a user, such as a sneak peak, in which a user may or may not be able to select a banner. This first threshold may only be a slight deviation from the determined default viewing orientation, such as a deviation between 10 to 30 degrees. The second threshold is more extreme and could be associated with the full display of the banners, in which the user can select and fully interact with a respective banner. The second threshold is, therefore, greater than the first and can include deviations from the default viewing angle that are greater than 30 degrees.

Further, although the rotations illustrated in the figures have been rotations away from the user (i.e. when the top of the device moves away from a user and the bottom of the device towards), many different directions of rotations, flicks, and translations are possible. For example, the device can be tilted toward the user, tilted to the right, or to the left. Further, the device could be flicked in a particular direction, where a flick is defined as a quick acceleration in one direction followed by an acceleration of similar magnitude in the opposite direction within a given period of time. Other types of motions made with the device or gestures made within view of at least one image capturing element of the device can also be used to trigger display of the banners in various embodiments.

As mentioned above, various approaches enable a user to interact with the banners as part of a three-dimensional display or quasi-three-dimensional rendering of the banners over text of the document or electronic reader on a two-dimensional display element. In this example, the banners are rendered to appear to be hovering above the text of the document or electronic reader. One or more cameras of the computing device can be used to track the relative head position of a user in order to detect rotational changes for displaying the banners and to assist in generating a perspective-appropriate "three-dimensional" image on a display screen of the device. Accordingly, changes in the relative position of the user's head, or other desired feature, can result from motion of the user or the device, or a combination of both. One or more sensors such as an electronic gyroscope or accelerometer can be used to track motion of the device and when the user moves out of the field of view of a camera that is tracking the head position, the sensors can provide information about the movement of the device to enable estimation of the current position of the user's head with respect to the device, as may be due to a rotation, tilting, or translation of the device.

Figure 4A:
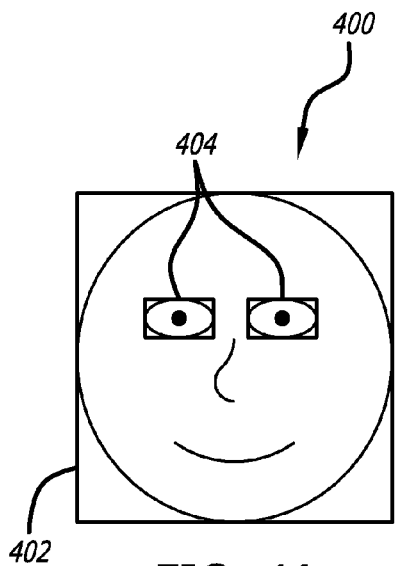
FIGS. 4A-4F illustrate example approaches to determining head position and/or gaze direction that can be used in accordance with various embodiments.

Further, various approaches can be utilized for locating one or more desired features of a user's head to determine various aspects useful for determining relative orientation. For example, an image can be analyzed to determine the approximate location and size of a user's head or face. FIG. 4A illustrates an example wherein the approximate position and area of a user's head or face 400 is determined and a virtual "box" 402 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 404 of each of the user's eyes (or in some cases the eyes in tandem). By determining the location of the user's eyes as well, advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth. Monitoring box size also helps to provide distance information as well as directional information, which can be helpful when generating a three-dimensional model for modifying image information based on relative user position.

Figure 4B:
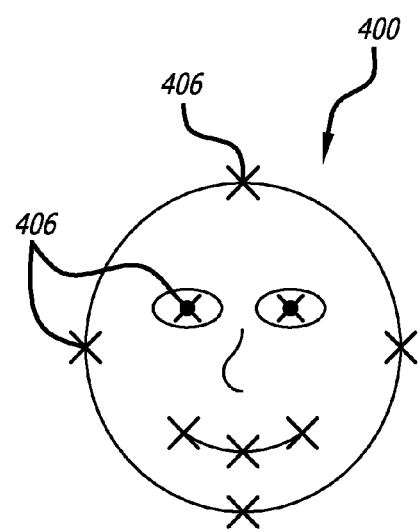

Various other algorithms can be used to determine the location of features on a user's head or face. For example, FIG. 4B illustrates an example wherein various features on a user's face are identified and assigned a point location 406 in the image. The system thus can detect various aspects of user features and can determine more subtle changes in orientation. Such an approach provides advantages over the general approach of FIG. 4A in certain situations, as various other features can be determined, in case the user's eyes cannot be seen due to glasses, hair, etc.

Figure 4C:
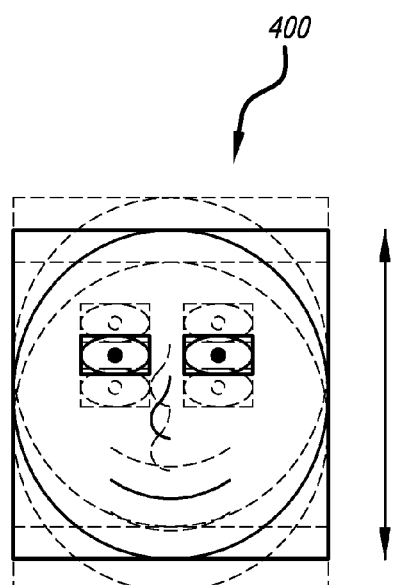
Figure 4D:
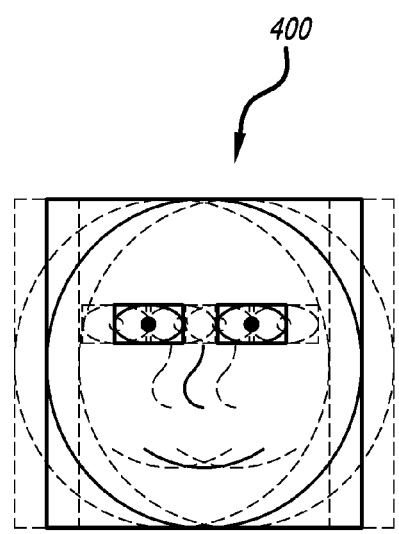
Figure 4E:
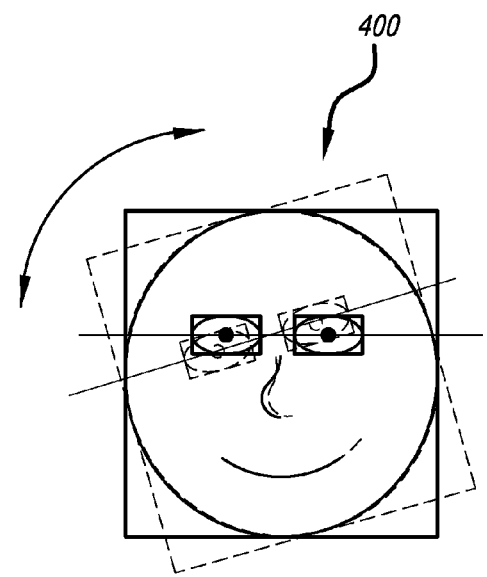
Figure 4F:
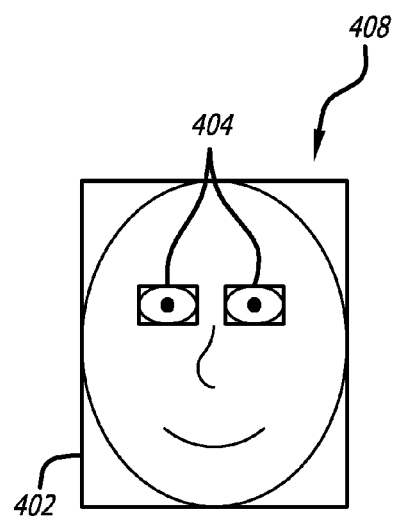
Figure 5A:
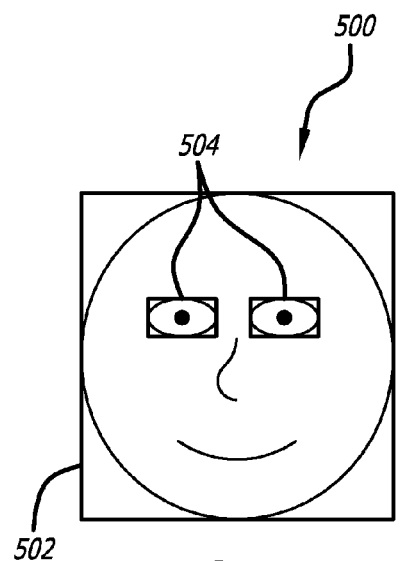
FIGS. 5A-5B illustrate example approaches to determining changes in the relative distance to a user in accordance with various embodiments.
Figure 5B:
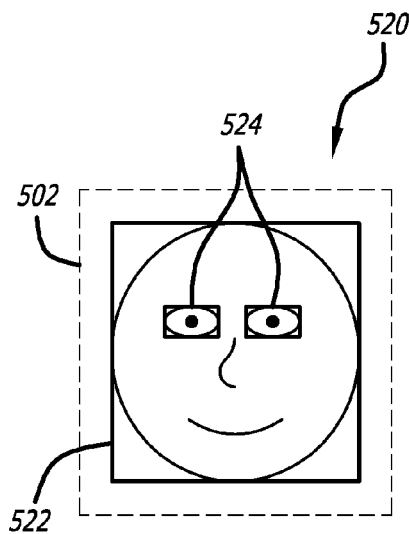

Once the positions of facial features of a user are identified, relative motion between the user and the device can be detected and utilized as input. For example, FIG. 4C illustrates an example where the user's head 400 is moving up and down with respect to the viewable area of the imaging element. As discussed, this could be the result of the user moving his or her head, or the user moving the device up and down, etc. FIG. 4D illustrates a similar example wherein the user is moving right to left relative to the device, through movement of the user, the device, or both. As can be seen, each movement can be tracked as a vertical or horizontal movement, respectively, and each can be treated differently as an input to modify a displayed image. As should be understood, such a process also can detect diagonal or other such movements. FIG. 4E further illustrates an example wherein the user tilts the device and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted as input. FIG. 4F illustrates another advantage of using an approach such as that described with respect to FIG. 4B to determine the position of various features on a user's face FIGS. 5A and 5B illustrate an example approach that can be used to determine variations in relative distance between a user and a device that can be used in accordance with various embodiments. As in FIG. 4A, the approximate position and area of a user's head or face 500 is determined and a virtual "box" 502 is placed around the face at an initial distance as an indication of distance using one of a plurality of image analysis algorithms for making such a determination. If the user is known, the size of the user's head might be stored such that an actual distance to the user can be calculated based at least in part upon the size of the box 502. If the user is not known, the distance can be estimated or determined using other factors, such as stereoscopic imaging. In some embodiments, determinations will be relative with respect to an initial box size when the actual distance cannot be determined.

As the distance between the user and the device changes, the size of the virtual box will change as well. For example, in FIG. 5B the distance between the user and the device has increased, such that the user's head 520 appears smaller in the captured image information. Accordingly, the size of the virtual box 522 for the adjusted size of the user's head is smaller than the original box 502 for the initial distance. By monitoring adjustments in the size of the box or another measure of the user's head and/or other such features (e.g., boxes 524), the device can determine an approximate distance and/or change in distance to the user. As discussed, this information can be used to adjust aspects of the displayed image information such as a level of zoom or amount of detail.

In some embodiments, a computing device can determine and track an approximate area or region of interest corresponding to the user's eyes, or another such feature, in the captured images such that an algorithm of the computing device only has to analyze image data corresponding to that region, which can significantly reduce the amount of processing needed for images, particularly for high resolution, full color images.

A number of other approaches can be used as well within the scope of the various embodiments. For example, thermal imaging or another such approach could be used to attempt to determine and track the position of at least some aspect of a human user. In many instances the imaging system is desired to be small and inexpensive enough for mass marketing, such that simple or conventional imaging approaches and components can be preferred.

As mentioned, it can be desirable in at least some embodiments to utilize at least two imaging elements (i.e., stereoscopic imaging) to determine the location of the user, as well as to capture image information to be displayed. In almost all situations the position of an imaging element will be offset from the eye of a user, such that some image translation and viewing angle adjustments may need to be made to ensure the consistency of the displayed image. Particularly for applications such as image stabilization from the point of view of the viewer, it can be important to compensate for differences in viewing angle resulting from the camera being offset from the user's eye.

Figures 6A, 6B:
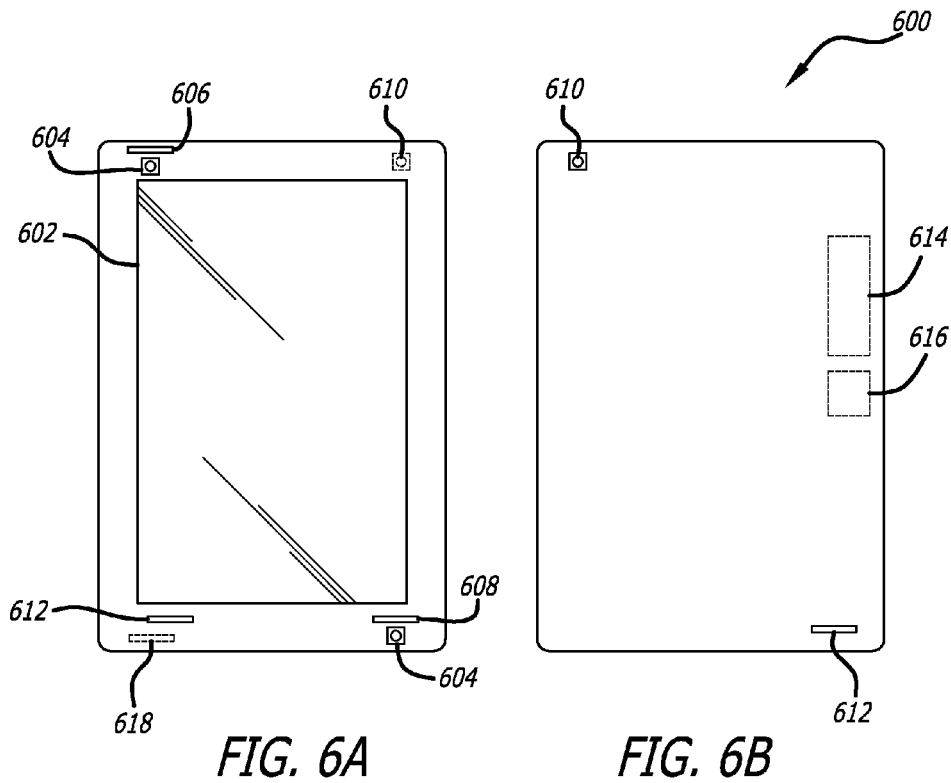
FIGS. 6A and 6B illustrate an example computing device that can be used to implement aspects of various embodiments.

FIGS. 6A and 6B illustrate front and back views, respectively, of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled device (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one communication mechanism 614, such as may include at least one wired or wireless component operable to communicate with one or more electronic devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
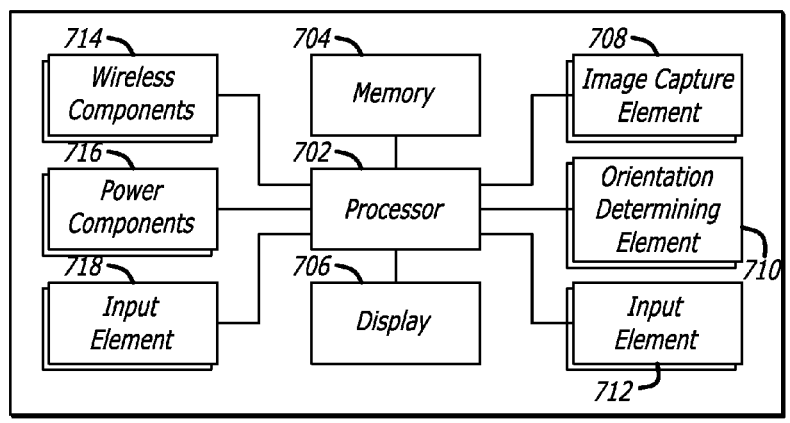
FIG. 7 illustrates example components that can be used with a device such as that illustrated in FIGS. 6A and 6B.

FIG. 7 illustrates a set of basic components of an electronic computing device 700 such as the device 600 described with respect to FIG. 6. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 718 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
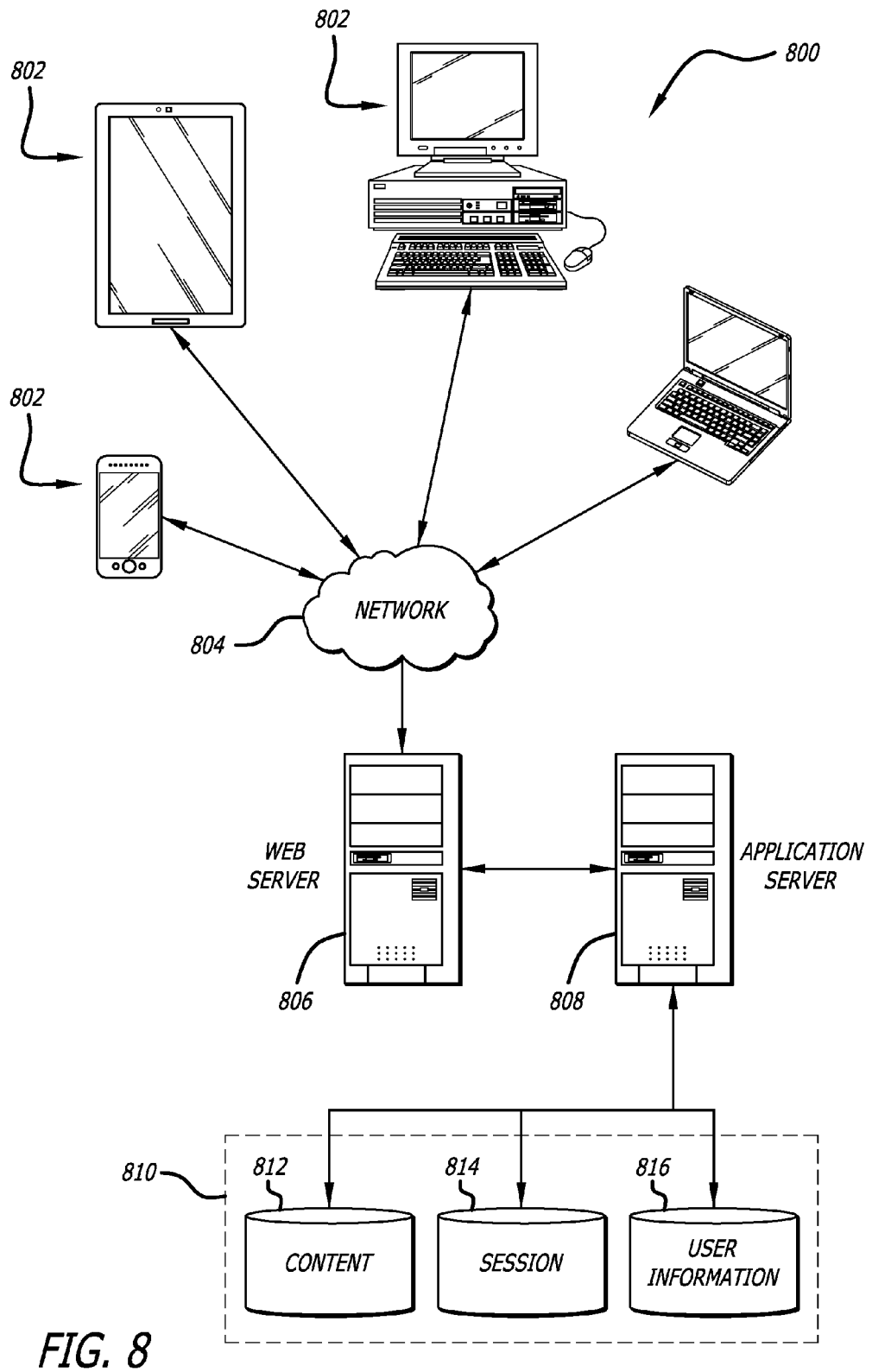
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    under control of one or more computer systems configured with executable instructions,
        displaying text on an interface of a computing device, the text including a plurality of text portions;
        determining a text portion of the plurality of text portions for which additional information is available;
        displaying a visual indicator associated with the text portion;
        determining a current orientation of the computing device;
        detecting a rotation of the computing device of at least a threshold amount about a determined axis; and
        displaying a banner for the text portion including at least a portion of the additional information for the text portion.

2. The computer-implemented method of claim 1, further comprising:
    determining a location of a head of a user relative to a front face of the computing device; and
    adjusting an appearance of the banner, based at least in part, upon the location of the head of the user.

3. The computer-implemented method of claim 2, further comprising:
    detecting an input indicative of a user selection of the banner; and
    displaying the additional information.

4. The computer-implemented method of claim 1, wherein the visual indicator is an indication of availability of the additional information for the text portion, and wherein the additional information for the text portion includes at least one of an alternative text portion, a definition, an image, audio, video, or a link to a web page associated with the additional information.

5. The computer-implemented method of claim 4, further comprising:
    detecting an input indicative of a user selection of the banner; and
    substituting the text portion with an alternative text portion.

6. The computer-implemented method of claim 1, further comprising:
    determining an amount of the rotation using at least one of an accelerometer, a gyroscope, or image information captured using at least one camera of the computing device;
    determining the amount of the rotation is greater than a first threshold;
    animating a display of a portion of the banner;
    determining the amount of the rotation is greater than a second threshold; and
    animating a full display of the banner.

7. The computer-implemented method of claim 1, further comprising:
    determining a viewing orientation of the computing device, based at least in part, on a position of a portion of a user viewing the text, wherein the rotation is detected based on a detected change in the viewing orientation.

8. The computer-implemented method of claim 1, wherein the visual indicator is displayed as an overlay on top of the text and adjacent to the text portion.

9. The computer-implemented method of claim 1, wherein the visual indicator is an indication of a misspelled word in the text, and wherein the banner includes an alternative word suggestion for the misspelled word.

10. The computer-implemented method of claim 9, further comprising:
    detecting an input indicative of a selection of the banner associated with the misspelled word; and
    substituting the misspelled word with the alternative word suggestion.

11. The computer-implemented method of claim 1, wherein the additional information is at least one of a link to glossary entry, a link to a wiki page, an annotation, an image associated with the text portion, a link to a webpage, a link to product information for a product associated with the text portion, a link to contact information for a contact in an address book, or a definition.

12. A computing device, comprising:
    a processor; and
    memory including instructions that, when executed by the processor, cause the computing device to:

display text on an interface of the computing device, the text including a plurality of text portions;

determine a text portion of the plurality of text portions for which additional information is available;

display a visual indicator associated with the text portion;

determine a current orientation of the computing device;

detect a rotation of the computing device of at least a threshold amount about a determined axis; and display a banner for the text portion including at least a portion of the additional information for the text portion.

13. The computing device of claim 12, wherein the instructions, when executed by the processor, further cause the computing device to:

determine an amount of the rotation is greater than a first threshold;

animate a display of a portion of the banner;

determine the amount of the rotation is greater than a second threshold; and animate a full display of the banner.

14. The computing device of claim 12, wherein the rotation is detected using at least one of an accelerometer, a gyroscope, or image information captured using at least one camera of the computing device.

15. A non-transitory computer-readable storage medium storing instructions that, when executed by at least one processor, cause a computing device to:

display text on an interface of the computing device, the text including a plurality of text portions;

determine a text portion of the plurality of text portions for which additional information is available;

display a visual indicator associated with the text portion;

determine a current orientation of the computing device;

detect a rotation of the computing device of at least a threshold amount about a determined axis; and display a banner for the text portion including at least a portion of the additional information.

16. The non-transitory computer-readable storage medium of claim 15, wherein the visual indicator is an indication of a misspelled word in the text, and wherein the banner includes an alternative word suggestion for the misspelled word.

17. The non-transitory computer-readable storage medium of claim 16, wherein the instructions, when executed by the processor, further cause the computing device to:

detect an input indicative of a selection of the banner associated with the misspelled word; and substitute the misspelled word with the alternative word suggestion.

18. The non-transitory computer-readable storage medium of claim 16, wherein the additional information is at least one of a link to glossary entry, a link to a wiki page, an annotation, an image associated with the text portion, a link to a webpage, a link to product information for a product associated with the text portion, a link to contact information for a contact in an address book, or a definition.

* * * * *